United States Patent [19]

Satoh et al.

[11] Patent Number: 4,470,866
[45] Date of Patent: Sep. 11, 1984

[54] RUBBER SHEET BONDING APPARATUS

[75] Inventors: Kazuo Satoh, Kobe; Tsutomu Nosaka, Kako, both of Japan

[73] Assignee: Sumitomo Rubber Industries, Ltd., Hyogo, Japan

[21] Appl. No.: 448,998

[22] PCT Filed: Aug. 31, 1982

[86] PCT No.: PCT/JP82/00350
§ 371 Date: Nov. 22, 1982
§ 102(e) Date: Nov. 22, 1982

[87] PCT Pub. No.: WO83/00838
PCT Pub. Date: Mar. 17, 1983

[30] Foreign Application Priority Data

Aug. 9, 1981 [JP]  Japan .................................. 56-141867

[51] Int. Cl.³ ........................ B29H 17/10; B29H 17/20
[52] U.S. Cl. ................................ 156/406.6; 156/421; 156/495; 156/411; 156/123
[58] Field of Search ................. 156/405.1, 406, 406.4, 156/64, 123 R, 184, 128.1, 157, 134, 133, 96, 522, 446, 457, 458, 468, 421, 495, 229, 128.6, 406.6, 122, 130.7, 130, 909, 130.3, 162, 411, 494; 226/168, 180, 190, 191; 242/56 R, 74

[56] References Cited

U.S. PATENT DOCUMENTS

| Re. 15,772 | 2/1924 | Stevens | 156/495 |
|---|---|---|---|
| 1,352,099 | 9/1920 | Stevens | 156/495 |
| 1,423,870 | 7/1922 | Morton | 156/495 |
| 2,346,439 | 4/1944 | Leguillon | 156/405.1 |
| 3,012,602 | 12/1961 | Nebout | 156/406 |
| 3,728,181 | 4/1973 | Simmons, Jr. | 156/96 |
| 3,844,871 | 10/1974 | Habert et al. | 156/362 |
| 3,847,705 | 11/1974 | Habert et al. | 156/405 |
| 3,874,974 | 4/1975 | Simmons, Jr. | 156/96 |
| 4,222,811 | 9/1980 | Enders | 156/406 |
| 4,359,675 | 11/1982 | Miller | 425/29 |
| 4,361,454 | 11/1982 | Nakahama et al. | 156/421 |

FOREIGN PATENT DOCUMENTS

| 532881 | 11/1956 | Canada | 156/495 |
|---|---|---|---|
| 0009597 | 3/1973 | Japan | 156/494 |

Primary Examiner—Edward C. Kimlin
Assistant Examiner—F. K. Wine
Attorney, Agent, or Firm—Eugene E. Geoffrey, Jr.

[57] ABSTRACT

A rubber sheet bonding apparatus useable particularly in forming tires, for supplying an unvulcanized rubber sheet (11) to a forming drum (1) to bond it around the outer peripheral surface of the drum (1) and to form a joint at a portion along the periphery thereof so that the rubber sheet (11) is formed cylindrical, in which in order to prevent incomplete joints due to contraction of the rubber sheet (11), the front portion of the rubber sheet (11) is stretched by a given amount and after that, the rubber sheet (11) is supplied to the drum (1) and wound around a major portion of the entire periphery of the drum (1), and then the trailing rubber sheet portion is cut such that the trailing rubber sheet portion is equal in length to the remaining portion of the periphery of the drum.

2 Claims, 5 Drawing Figures

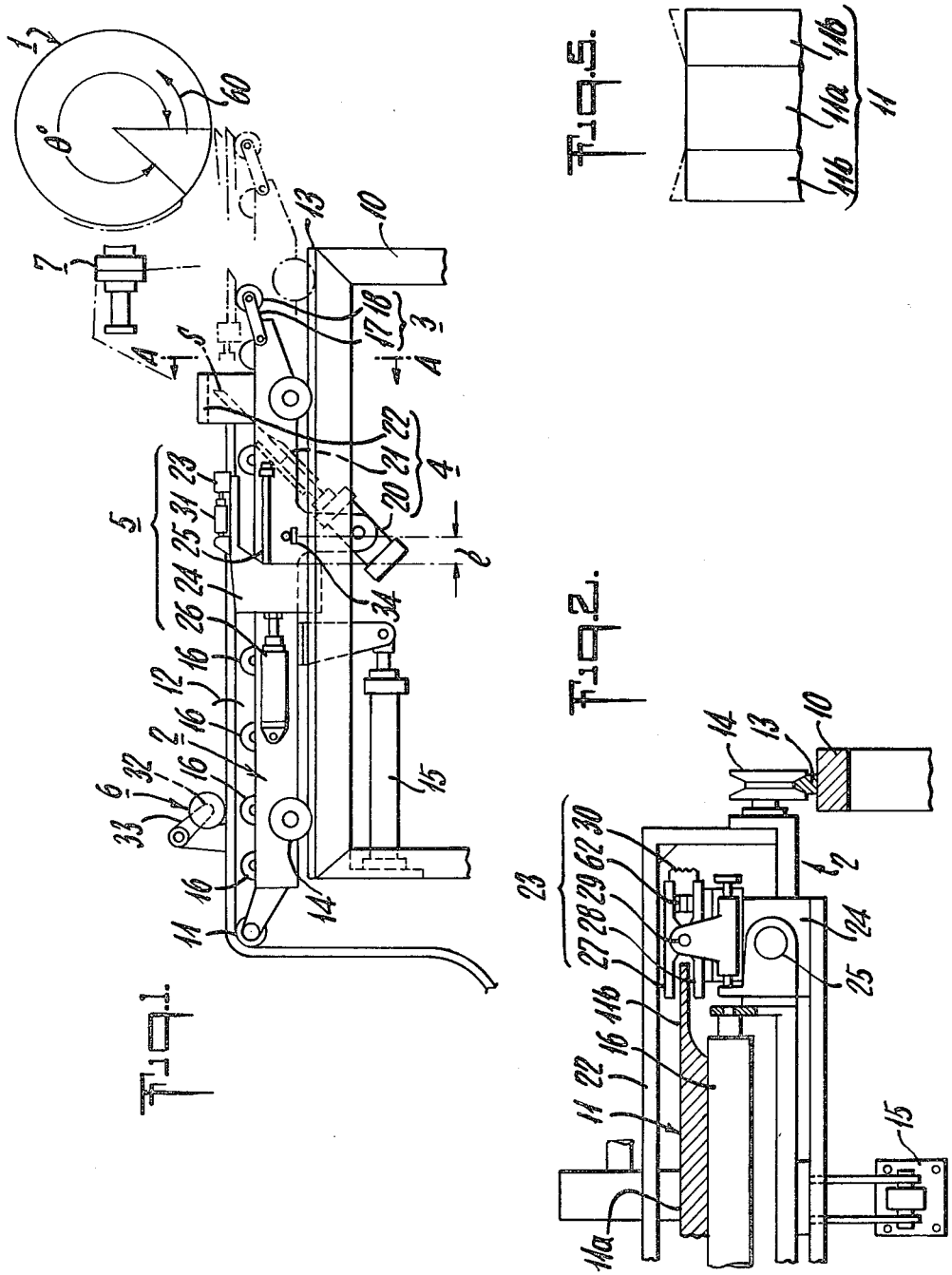

4,470,866

RUBBER SHEET BONDING APPARATUS

DESCRIPTION

1. Technical Field

This invention relates to rubber sheet bonding apparatus for use in forming a green-rubber tire, for bonding a rubber sheet which is a tire constituent material, on a tire forming drum.

2. Background of Art

Conventionally, in a green-tire forming system, for bonding a rubber sheet which comprises, for example, tread and side-wall sections formed integrally by extrusion, to a carcass layer applied over a forming drum, the rubber sheet is cut in a length corresponding to the circumference of the drum beforehand on a conveyor which is disposed adjacent to the drum, and the cut of the rubber sheet is supplied to the drum by means of a feeding conveyor synchronized with the peripheral speed of the forming drum, so that automatic bonding of the rubber sheet is performed. Such conventional techniques are disclosed in, for example, Japanese Patent Publication No. SHO 43-28604, Japanese Patent Publication No. SHO 53-24463 and Japanese Patent Publication No. SHO 55-36500. In such conventional systems, however, since the rubber sheet is left as it is for a given time after it is cut to a predetermined length, until it is bonded, it contracts so that the size changes. Then an appropriate joint cannot be formed, and problems such as incomplete joints in side-wall sections are generated. Thus it has been difficult to provide reliable automation of bonding of rubber sheets of this kind. A large problem with a sheet of unvulcanized rubber, particularly a rubber sheet in the form of tread and side-wall sections formed integral with each other by extrusion, is that the amount of contraction in the length direction is larger in the side portions that the longitudinal center portion of the sheet. Also, since a conventional system requires a rubber sheet supplying apparatus (such as a feed-out conveyor, for example) which can operate in synchronism with the peripheral speed of the forming drum, a problem arises since its size is very large.

The primary object of this invention is to provide a rubber sheet bonding apparatus for bonding a rubber sheet, which is a material forming a tire over a drum to form a joint, with which the sheet applied or bonded for the most part to the drum can be cut in an exactly desired length to thereby form the joint properly.

The second object of this invention is to minimize the size of rubber sheet bonding apparatus.

DISCLOSURE OF INVENTION

A rubber sheet bonding apparatus according to the present invention comprises: a forming drum of which the amount of rotation is controllable; a main frame movable toward and away from the drum and having a transport and guide portion for supplying a rubber sheet to said drum along the direction of movement thereof; a cutting structure provided on said main frame to traverse said transport and guide portion so as to cut said rubber sheet; a chuck structure provided on said main frame in such a manner as to be movable back and forth along the direction of movement of said main frame, said chuck structure holding a portion of the rubber sheet in the vicinity of its end portion and advancing toward the drum to thereby position the end of the rubber sheet in a predetermined position ahead of the main frame; a pressing structure mounted on said main frame at its front end for pressing against and bonding the front end of said rubber sheet to said drum when the sheet is positioned in said predetermined position by said chuck structure and said main frame is in its advanced position; and a brake structure mounted on said main frame and operating to hold said rubber sheet by its rear portion only during a portion of the entire travel of said chuck structure holding said rubber sheet. Preferably, the rubber sheet bonding apparatus arranged as the above may further comprise a closure structure mounted to face a predetermined position on the surface of said drum, which closure structure includes closure members which abut said rubber sheet wrapped around said drum across its opposing ends and shift so as to make said opposing ends of said rubber sheet come closer to each other.

In this rubber sheet bonding apparatus, a rubber sheet to be supplied to the drum is not cut in a predetermined length beforehand, but a long rubber sheet can be used. In the apparatus of this invention, the front end of the long rubber sheet is first made to adhere to the forming drum, and then the rubber sheet is wound around the drum to bond it around a major portion of the peripheral surface of the drum. Then the rubber sheet is cut at its rear, non-bonded portion such that the length of the portion of the rubber sheet which has not yet been bonded just corresponds to the peripheral length of the remaining portion of the drum surface, and then the rubber sheet is bonded onto the remaining portion of the drum. In other words, since the present rubber sheet bonding apparatus is so constructed that only after the rubber sheet is bonded on the drum along a major peripheral length thereof, is it cut to a required length. Thereafter the rubber sheet can be cut in an exact required length which is not substantially affected by the contraction of the sheet, so that a desirable joint can be formed. In addition, since the cooperation of the chuck structure and the brake structure enables the side portions of the rubber sheet at the front end to be stretched by a desired amount prior to the bonding on the drum and jointing, the side portions of the joint are further improved, so that incomplete or so-called open joints can be avoided. This effect is remarkable particularly in case that the rubber sheet comprises a tread section and side-wall sections which are formed integral with each other by extrusion. The arrangement to which the closure structure is additionally provided can more assuredly provide proper joints.

In the present rubber sheet bonding apparatus, once the front end of the rubber sheet is bonded to an article on the drum, the rubber sheet is pulled out by the rotation of the drum and, therefore, any additional rubber sheet supply means which would operate in synchronization with the rotation of the drum is not required. Furthermore, the length of the main frame need not be such as to accomodate a rubber sheet of the length to be bonded around the entire periphery of the drum. Thus the apparatus can be formed in a small size.

Using the present rubber sheet bonding apparatus, when the rubber sheet is a tread section with side-wall sections of a tire, or, in some cases, only a tread section, only side-wall sections, an under-tread or inner side-walls, the ends can be jointed in the direction along the periphery of the drum to form a desirable joint. The present rubber sheet bonding apparatus cn also form a good joint of not only a tire but also of a rubber sheet having a thickness to be shaped into a cylindrical form.

BRIEF DESCRIPTION OF DRAWINGS

FIG. 1 is a side view schematically showing the arrangement of one embodiment of the present invention;

FIG. 2 is an enlarged cross-sectional view of a portion along A—A of FIG. 1;

FIG. 5 is a plan view of the front end of a rubber sheet of which side edge portions are stretched.

BEST MODE OF EXPLOITATION OF INVENTION

Figure 3:
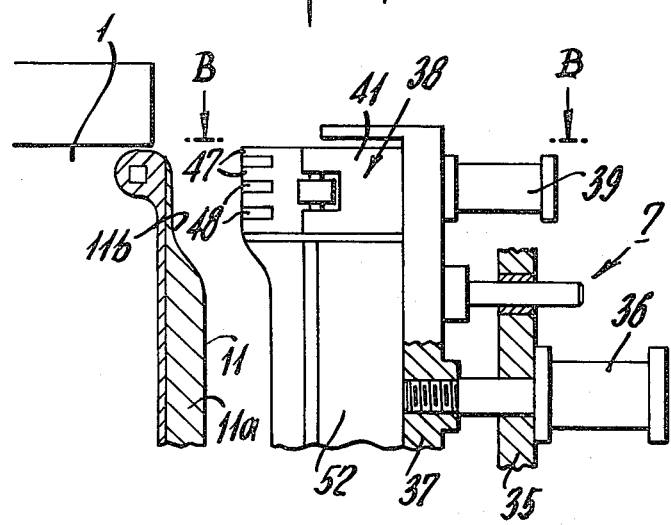
FIG. 3 is an enlarged, cross-sectional plan view of a portion of a closure structure.

For detailed explanation of the present invention, one embodiment is now explained with reference to the accompanying drawings.

The apparatus of this embodiment is used for bonding a tread rubber sheet with side-wall sections attached to it, to a carcass ply for a tire placed over the surface of a tire forming drum. The arrangement of this apparatus is shown schematically in FIG. 1. The apparatus comprises a forming drum 1, a main frame 2, a pressing structure 3, a cutting structure 4, a chuck structure 5, a brake structure 6, and a closure structure 7.

The forming drum 1 is so arranged as to be particularly controllable in its amount of rotation precisely, so that it can be stopped after a rotation of a desired angle from one position. The drum 1 is driven to rotate by a main motor (not shown) via a timing belt (not shown). A control apparatus which comprises a pulse generator generating 3600 pulses per rotation of the drum 1, a pulse counter, and a device for setting an angle of rotation in accordance with the number of the pulses, is provided for controlling the drum 1 to stop after the rotation by a set angle $\theta°$ in response to a predetermined electrical signal. The length of the tread rubber sheet 11 from the end bonded to the drum to the portion at a cutting station S when the drum 1 has rotated by the angle $\theta°$ is equal to the length of the rubber sheet required for wrapping the entire peripheral surface of the drum plus a given amount (or length) for an overlap at the joint. That is, by controlling the rotation angle $\theta°$ of the drum, any desired length of the rubber sheet can be obtained.

The main frame 2 is so mounted as to advance toward and retreat from beneath the drum 1 on a stationary base 10, and the top of the main frame 2 is formed to provide a transport and guide portion 12 for the rubber sheet 11. In the drawings, 13 represents rails provided on the stationary base 10, 14 represents wheels provided on the main frame 2, and 15 is an air cylinder for driving the main frame to advance and retreat. 16 are freely rotatable rollers which constitute the transport and guide portion 12.

The pressing structure 3 is mounted at the front end of the main frame 2 on its drum side, and comprises a freely rotatable roller 18 supported by arms 17, and an air cylinder (not shown) which pivotally rotates the arms 17 upward to press the roller 18 against the drum 1.

The cutting structure 4 is for cutting the rubber sheet 11 in a given length on the main frame 2 when the rubber sheet 11 has been wrapped almost completely about the periphery of the drum 1. The cutting structure 4 is mounted on the main frame 2 at a location near the rear of the pressing structure 3. A cutting blade 21 advances from its lowered position in a diagonally upward direction at an angle of, for example, about 30°, to traverse the transport and guide portion 12, and retreats to said lowered position, through the action of an air cylinder 20. The cutting blade 21 is provided with a heater. Ahead of the cutting blade 21, there is provided an abutment plate 22. During the cutting operation, the rubber sheet 11 is pushed upward by the cutting blade 21 to abut the bottom surface of the abutment plate 22 and is cut.

The chuck structure 5 is for holding the rubber sheet 11 to move the front portion of the rubber sheet 11 to the position where the pressing structure 13 is located, and also for stretching by a small amount the side-wall sections which are particularly contractile, prior to the bonding to the drum (as indicated by dotted lines in FIG. 5). The chuck structure 5 is arranged such that a chuck 23 is mounted on a chuck support frame 24, which, in turn, is driven by an air cylinder 26 to move back and forth on the main frame 2 along a guide rod 25 in the direction of the movement of the main frame 2. A chuck 23 is mounted on each side of the rubber sheet so as to hold the side-wall sections on each side in the vicinity of the cut end. Each of the chucks 23 comprises, as is seen from FIG. 2, chuck members 27 and 28 having their intermediate portions supported by a pivot 29, and having their respective inner sides forming holding portions which move up and down. A spring 30 is mounted on the outer ends of the chuck members to give a force to always open the chuck members. In addition, a wedge 62 is provided which is driven into and out from between the outer ends of the chuck members 27 and 28 by an air cylinder 31 (FIG. 1), and by which the opening and closing operation of the chuck members 27 and 28 is carried out.

The brake structure 6 comprises a roller 32 disposed to face one of the rollers 16 of the transport and guide portion 12 which is located relatively backward, and to hold the rubber sheet 11 on the transport and guide portion 12, and a support 33 supporting the roller 32 on the main frame 2. An electromagnetic brake device is provided in the support 33 for enabling the roller 32 to assume a freely rotatable state or a stopped, braking state in response to given electrical signals. The braking action is provided between the time when the chuck support frame 24 starts to advance and the time when the frame 24 has advanced a predetermined distance (e.g. the distance l in FIG. 1). A limit switch 34 is provided on the main frame 2 such that an appropriate portion of the frame 24 acts on the switch. In other words, immediately before the frame 24 starts to advance, the roller 32 applies the brake, and when the frame 24 disengages the actuator of the limit switch 34 the braking is terminated. During the braking action of the roller 32, the rubber sheet 11 is held at its one end by the roller 32 and the roller 16 and is stretched due to the advance of the chuck structure 5 at the other end, and, therefore, the front end of the rubber sheet 11 is forced to stretch by a given amount. The amount of stretch can be adjusted, whenever it is short or excessive, by adjusting the position of the limit switch.

Figure 4:
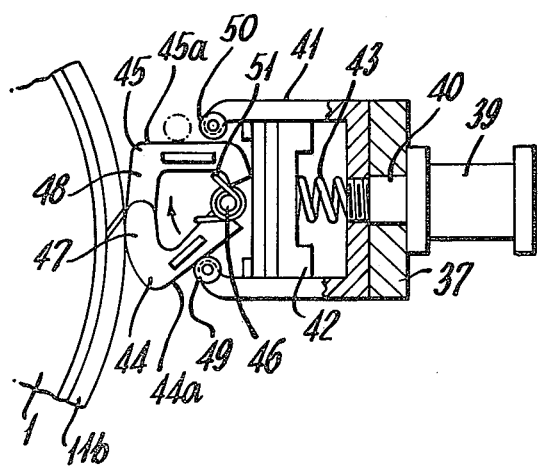
FIG. 4 is an enlarged cross-sectional view of a portion along B—B of FIG. 3 in a different state.

The closure structure 7 is disposed above the front end portion of the main frame 2 so that it faces a portion of the surface of the drum 1, as shown in FIG. 1. The closure structure 7 comprises, as shown in FIGS. 3 and 4, an air cylinder 36 mounted on a fixed frame 35, a movable frame 37 mounted on the piston rod of the air cylinder 36, which frame 37 is movable toward and away from the drum 1, and closure assemblies 38 mounted on the both sides of the movable frame 37, respectively. In the present embodiment, the closure asemblies 38 are provided on the both sides in order to effect the closure action only on the side-wall sections on the both sides of the rubber sheet 11. One closure assembly 38 is now explained. An air cylinder 39 is fixed on the movable frame 37. A U-shaped member 41 with the forward side open is mounted to the piston rod 40 of the air cylinder 39. A movable member 42 which can move back and forth is disposed in the member 41 and is always pressed forward by a spring 43. Closure members 44 and 45 are rotatably supported by the member 42 via a pivot 46. The closure members 44 and 45 have fingers 47 and 48 which are placed in an interdigitated relation with each other when the closure members 44 and 45 are rotated. As shown in FIG. 4, one of the closure members, 44, includes a slanted surface 44a, and the other member 45 includes a flat surface extending in the direction in which the structure moves. Rollers 49 and 50 disposed on the respective limbs of the U-shaped member 41 are in contact with the surfaces 44a and 45a, respectively. Between the closure members 44 and 45 and at the position of the pivot 46, a spring 51 acting to open the members 44 and 45 is mounted. In the drawings, the reference numeral 52 represents a crown pressing member. This closure assembly 38 operates in such a manner that when the air cylinder 36 extends its piston rod the movable frame 37 moves forward so that the closure members 44 and 45 are brought into contact with the joint portion of the rubber sheet 11 on the drum and the member 52 presses against the crown section. Then, as the air cylinder 39 operates to extend, the U-shaped member 41 moves forward, whereby, by virtue of the slanted surface 44a, the closure member 44 is driven toward the closure member 45 so that the fingers 47 and 48 are interleaved with each other. Thus, the ends of the rubber sheet 11 are shifted toward each other so that the gaps between the ends at the both sides of the rubber sheet 11 with which the fingers 47 and 48 are in contact will be eliminated.

The rubber sheet bonding apparatus explained above is operated in sequence under sequence control. The sequence of operations is explained hereinafter. One end of the long rubber sheet 11 consisting of a tread section 11a and side-wall sections 11b, wound on, for example, a reel, is pulled out via a loop onto the transport and guide portion 12 of the main frame 2, and the front end is positioned in the vicinity of the pressing structure 3. Then, the cutting structure 4 is enabled to cut the front end of the rubber sheet 11 at a given angle. At this time, the chucks 23 hold and fix the two side-wall sections 11b of the rubber sheet 11. This is an initial preparation. When the chucks 23 are in the holding operation, the brake structure 6 is also operative, so that when the apparatus is operated in this state, the chucks 23 move toward the drum 1, while holding the rubber sheet 11, to thereby stretch the side-wall sections 11b in cooperation with the brake structure 6. When the chuck support frame 24 advances a given distance and turns off the limit switch 34, the chuck structure 5 stops and, at the same time, the braking action of the brake structure 6 is terminated. Subsequently, the chuck structure 5 starts to advance again so that the rubber sheet 11 is pulled out. Then, the chuck structure 5 stops at the most advanced end when the piston rod of the cylinder 26 extends most. Thus, the front end of the rubber sheet 11 is placed above the pressing structure 3. Next, the main frame 2 is advanced by the cylinder 15 which operates in its full stroke, and then stops. In this state, the front end of the rubber sheet 11 is immediately beneath the drum 1 on which a carcass ply is applied, and then is pressed and bonded to the drum 1 by the pressing structure 3 which is operated subsequently. In response to a signal indicating the completion of the operation of the pressing structure 3, the chuck structure 3 operates to open the chucks 23 and retreat to the original position, and, at the same time, the drum 1 begins to rotate in one direction (indicated by an arrow 60) by, e.g. 300°. As the drum 1 completes the rotation of 300° in said one direction and stops, the cutting structure 4 is activated to cut the rubber sheet 11. After that, the drum 1 rotates further 60° in said one direction, whereby the portion of the rubber sheet 11 which has not yet been bonded is bonded and the front end and the rear end of the cut rubber sheet 11 are mutually jointed. Subsequent to it, the drum 1 rotates in the opposite direction by 90°, so that the jointed ends of the rubber sheet 11 face the front of the closure structure 7, while the main frame 2 retreats to its original position. Subsequent to the termination of the rotation of the drum 1, the closure structure 7 advances, and after it operates to close the jointed ends of the side-wall sections 11b in the manner as stated previously, the closure structure 7 retreats.

The above-explained embodiment includes the closure structure 7 for ensuring the jointing of the side-wall sections, and, therefore, the closure structure can be omitted in some cases.

POSSIBILITY OF INDUSTRIAL UTILIZATION

The rubber sheet bonding apparatus according to the present invention is used in forming green-tires for supplying and bonding to a tire-forming drum unvulcanized rubber sheets which are materials for tires, more particularly, unvulcanized rubber sheets for forming tire treads, side-walls, under-treads, inner side-walls, or the like.

What is claimed is:

1. A rubber sheet bonding apparatus comprising: a tire forming drum of which the amount of rotation is controllable; a main frame movable toward and away from said drum and including a transport and guide portion extending along the direction of movement thereof for supplying a rubber sheet to said drum; a cutting structure mounted on said main frame in such a manner as to traverse said transport and guide portion to thereby cut said rubber sheet; a chuck structure mounted on each side of said main frame in such a manner as to be movable back and forth along the direction of movement of said main frame, said chuck structures holding the side portions of said rubber sheet in the vicinity of the front end of said rubber sheet and advancing toward said drum to thereby position the front end of said rubber sheet in a predetermined position ahead of said main frame; a pressing structure mounted on said main frame at the front end thereof for pressing against and bonding to said drum the front end of said rubber sheet positioned in said predetermined position by said chuck structure, when said main frame is in the advanced position thereof; and a brake structure mounted on said main frame and operating to hold said rubber sheet by the rear portion thereof only during a portion of the entire travel of said chuck structures holding said rubber sheet.

2. A rubber sheet bonding apparatus according to claim 1, wherein there is further provided a closure structure facing a predetermined position on the peripheral surface of said drum, and including closure members which abut said rubber sheet wrapped around said drum across the jointed portion thereof and shift so as to make the jointed ends come closer to each other.

* * * * *